United States Patent [19]

Cerracchio

[11] 4,375,101
[45] Feb. 22, 1983

[54] SYSTEM FOR FORMATTING DATA ON VIDEO TAPE FOR HIGH ACCURACY RECOVERY

[75] Inventor: Nicholas Cerracchio, Las Vegas, Nev.

[73] Assignee: Video Education, Inc., Reno, Nev.

[21] Appl. No.: 192,226

[22] Filed: Sep. 30, 1980

[51] Int. Cl.³ .............................................. G06F 11/08
[52] U.S. Cl. ...................................... 371/69; 371/13; 371/36; 360/53
[58] Field of Search ............... 371/13, 69, 36; 360/18, 360/38, 53, 47

[56] References Cited

U.S. PATENT DOCUMENTS

| | | | |
|---|---|---|---|
| 3,059,266 | 10/1962 | Cleveland | 371/13 |
| 3,263,215 | 7/1966 | Brooke | 371/13 |
| 3,531,769 | 9/1970 | Montgomery et al. | 371/69 |
| 3,761,903 | 9/1973 | Bird, Jr. et al. | 360/53 |
| 3,863,215 | 1/1975 | McGrogan, Jr. | 371/69 |

FOREIGN PATENT DOCUMENTS

2029170 3/1980 United Kingdom ................. 371/69

*Primary Examiner*—Charles E. Atkinson
*Attorney, Agent, or Firm*—Flehr, Hohbach, Test, Albritton & Herbert

[57] ABSTRACT

A system for formatting data on video tape for high accuracy recovery in which binary data is recorded on the video signal track of video tape in a prearranged format of three redundant blocks of data words between successive vertical sync pulses. Each redundant block of data words is preceded by a set of at least three redundant sync words and the last block of data words is followed by a fourth set of redundant sync words. The redundant sync words in each set are separated from each other by a plurality of blank horizontal sync pulse intervals. Circuitry for recovering data in this format is disclosed together with a system for writing data in this format.

10 Claims, 10 Drawing Figures

SYSTEM FOR FORMATTING DATA ON VIDEO TAPE FOR HIGH ACCURACY RECOVERY

This invention relates generally to computer data storage systems and more specifically to a system for storing and recovering binary data on video tape using a prearranged data format which enables high data recovery accuracy.

Magnetic tape based digital data systems have been available in the computer art for many years. The successful use of magnetic tape media in such data systems is dependent on the magnetic recording medium on the tape being of uniformly high quality throughout the tape area utilized for data storage. Defects in the magnetic media would result in data errors which cannot be tolerated when the magnetic tape is utilized for storing either software instructions or important data to be processed by the associated computer system. Digital magnetic tape systems for computers generally cost many thousands of dollars and the individual tapes themselves are also expensive due to the manufacturing cost of producing a virtually defect-free magnetic recording medium on the tape.

On the other hand, video tape recorders have also been available in the art for many years and the cost of a video tape is far less than the cost of a computer digital tape. The signal bandwidth on the video track of video tape is sufficient to permit fairly high density recording of digital data. The problem that is encountered in attempting to utilize video tape for digital data storage is that the video tape recording medium is usually not sufficiently defect-free to enable high accuracy recovery of the digital data.

When utilized for recording normal video program information to be recovered and displayed on a video monitor, small defects in the magnetic medium on the video tape are not of great concern since the picture quality of the recovered signal is not substantially degraded by defects such as small scratches and pinholes in the magnetic recording medium. In other words, for normal live image recording and playback, the typical video tape may have a substantial number of defects at regular intervals throughout the length of the tape without being considered defective for live video recording and playback. The same tape defects, however, would introduce errors into digital data if such data were attempted to be recorded on and recovered from the video tape. If the recorded digital data contained software program information or important data to be processed by a computer system, such data errors would be intolerable since they would either cause a run time error in trying to execute the program or would degrade the data base as the erroneous data recovered from the tape is processed. Because of the level of defects in video tape media, it has been considered unsuitable for use as a data recording medium where high accuracy recovery of that data is absolutely essential to the functioning of the associated computer system. Consequently, up till now, recording of data on video tape has been generally limited to systems which can tolerate a substantial number of data errors.

It is a principal object of this invention to provide an improved system for recording binary data on video tape.

It is an object of this invention to provide a system for formatting digital data on video tape which enables high accuracy recovery thereof.

It is another object of this invention to provide an improved data storage and retrieval system based on the use of video tape and a video tape player.

It is another object of this invention to provide an improved method of storing binary data words on video tape and recovering the stored data words with high accuracy.

In accordance with one aspect of this invention the above-stated objects are achieved by providing a prerecorded tape which is adapted to be played on a video tape player with the video tape having binary data recorded on the video signal track thereof in a prearranged format comprising at least three redundant blocks of data words between successive vertical sync pulses recorded on the video signal track. Preferably, each data word on the tape is written between a pair of successive horizontal sync pulses and each of the redundant blocks of data words is preceded by a set of at least three redundant sync words. The sync words in each of the sets are separated from each other by a plurality of blank horizontal sync pulse intervals and have a data content indicating the block number of the following block of data words. To enable the redundant blocks of data words to vary in length from one vertical sync pulse interval to another, the prearranged format also includes a set of at least three redundant sync words at the end of the last of the data blocks having a data content indicating the end of a set of redundant data blocks. The sync words in the last set are also separated from each other by a plurality of blank horizontal sync pulse intervals.

In accordance with another aspect of this invention and to provide a program tape which is adapted to have groups of data intermixed with live video segments, data blocks on the tape are formatted with an initial tone signal recorded on the video signal track to signal the presence of the data group with at least one data segment following the tone signal and being recorded on the video signal track between successive vertical sync pulses in the same preferred prearranged format of redundant data blocks and sets of redundant sync words as set forth above. Preferably, each of the sync words and the data words include one or more bits which differentiate the sync words from the data words to avoid dedicating particular binary data words as sync words for data block number identification.

In accordance with this another aspect of this invention the above-identified objects are achieved in a data storage and retrieval system which includes a video tape player, a prerecorded tape with digital information on the video signal track, and a data retrieval means coupled to the VTR. The prerecorded tape is adapted to be played on the video tape player to recover signal information on the video signal track including the binary data words recorded thereon. The binary data words are recorded on the video signal track in the format of at least three redundant blocks of data words between successive vertical sync pulses recorded there on the video signal track. The data retrieval means is coupled to the VTR for recovering the individual data words as the prerecorded tape is played on the VTR and is adapted to store the recovered data words in redundant sets and to compare associated data words in the redundant sets for selecting and storing valid data words based on finding identity among a preselected plurality of associated data words in the redundant sets. It has been found satisfactory to utilize three redundant blocks of data words with the data retrieval means performing a two-out-of-three compare to validate the data words when identity is found between two of the three redundant words.

In accordance with another aspect of this invention, a method of storing binary data words on video tape and recovering the data words with high accuracy is provided. The method importantly includes the step of recording segments of data words on the video signal track of the video tape between successive vertical sync pulses in a prearranged format comprising at least three redundant blocks of data words. In accordance with the method, the video tape is played on a video tape player to recover video signal information including the data segments on the video signal track. Individual data words are recovered from the video signal information as the tape is played. The recovered data words are stored in identifiable, redundant blocks and associated ones of the stored data words are compared to test whether a preselected plurality of the data words are identical thereby validating data words passing this test. Finally, the validated data words are stored for use by the computer system.

This invention is based on the discovery that the typical defects in video tape media, such as scratches and pinholes, generally have configurations and sizes such that, when data is formatted in the above-described fashion, localized defects in the tape will generally at most obliterate or introduce errors into only one sync word of a redundant set provided about six horizontal sync pulse intervals are provided as separation between the sync words in each set. Furthermore, by formatting the data in blocks of at least three redundant data blocks, it has been discovered that generally only data in one of those three redundant blocks will be affected by tape defects leaving the other two blocks of redundant data to be utilized effectively for data validation. In actual tests over a substantial period of time the system and method of this invention has proven to provide a highly accurate approach to recording and recovering data from video tape and has enabled the development of a low cost user interactive video display system as described in a copending patent application in the names of Nicholas Cerracchio and Dale Rodesch entitled "Interactive System and Method for the Control of Video Playback Devices", Ser. No. 06/083,821 filed on Oct. 11, 1979. This invention permits the recording of program software information in data dumps on the video signal track of the video tape together with alphanumeric data to be utilized to generate full page alphanumeric data displays on a video monitor. The high accuracy recording and recovery ability of the system and method of this invention provides accurate software control of the microcomputer system employed in the above-identified copending application. The system and method of this invention could also be utilized in conjunction with other types of systems requiring digital data storage and could be effectively adapted to providing a relatively inexpensive mass data storage device for home and small business microcomputer systems.

Other objects, features and advantages of this invention will become apparent from a consideration of the following detailed description of preferred embodiments thereof in conjunction with the accompanying drawings.

Figure 1:
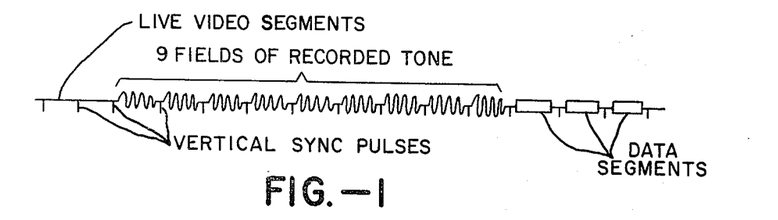
FIG. 1 illustrates one aspect of the approach to formatting digital data in accordance with this invention.

FIG. 1 illustrates the general format of writing data on the video signal track of a video tape in accordance with this invention where the data groups are intermingled with live video segments on the tape. As shown in FIG. 1, at the end of an initial group of live video segments, a number of fields of recorded tone are provided in order to signal the existence of a data group. As will later be seen these fields of recorded tone are detected in a data recovery circuit and utilized to enable the data recovery circuit to begin to recover data from the following data segments. In systems not requiring the intermingling of live video segments and data segments, fields of recorded tone to signal the oncoming data segments would not be required.

Figure 2:
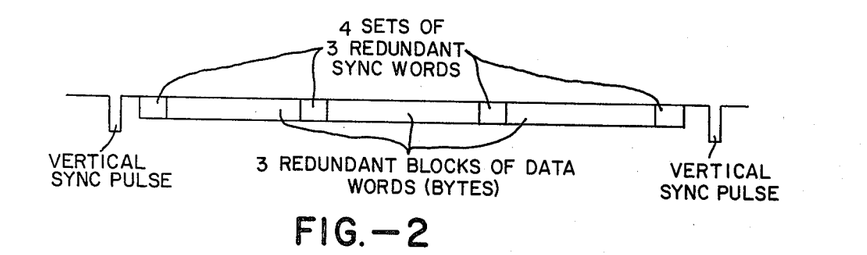
FIG. 2 illustrates the basic format of recorded digital data in accordance with this invention.
Figures 3, 4:
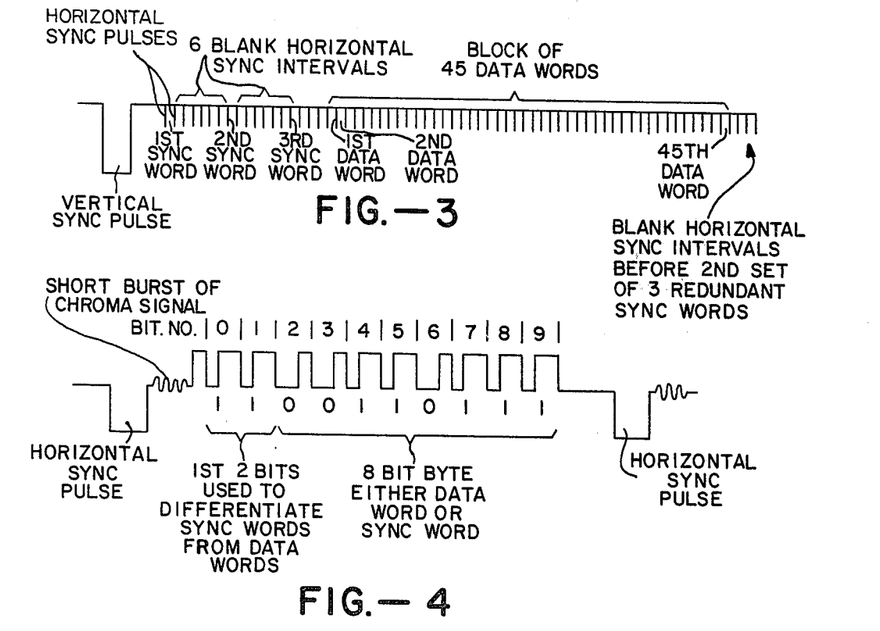
FIG. 3 illustrates in greater detail some features of the data format arrangement of this invention.
FIG. 4 illustrates a preferred data word format in accordance with this invention.

As shown in FIG. 2, the format of each data segment recorded between successive vertical sync pulses involves three redundant blocks of data words each preceded by a set of three redundant sync words with the last block of redundant data words followed by a fourth set of three redundant sync words. FIG. 3 shows in more detail the format of the sets of redundant sync words. As shown the sync words in each set are separated by a plurality of blank horizontal sync intervals, for example the six blank horizontal sync intervals illustrated in FIG. 3. Each of the sync words and the data words is recorded between successive horizontal sync pulses as illustrated in FIG. 4. The first two bits of each word are used to differentiate sync words from data words and the last eight bits constitute the actual data word or sync word. As shown in FIG. 4, a burst of chroma signal is recorded after each horizontal sync pulse. The burst of chroma signal is provided if the data is to be recovered on a VTR operating in the color mode. Without the color burst following the horizontal sync pulse, the video tape recorder switches internally to monochrome mode causing a temporary signal level shift which tends to obliterate the following data bit signals.

While three redundant blocks of data words and sets of three redundant sync words are depicted in FIGS. 2 and 3, it should be understood that it would also be possible to utilize more redundant blocks of data words and more redundant sync words in each set. As will later be discussed, recovery of valid data is based on a two-out-of-three-word compare operation on the individual sync words and data words for the case where three redundant words are provided. If four or five redundant data words were provided a two-out-of-four or three-out-of-five compare operation could be implemented to validate data words. In practice, the utilization of three redundant blocks of data words and sets of three redundant sync words has proven to be an effective way of assuring high accuracy recovery of data on video tape. Use of greater redundancy would greatly reduce information density with apparently insignificant contribution to achieving high accuracy data recovery.

Figures 5A, 5B, 8:
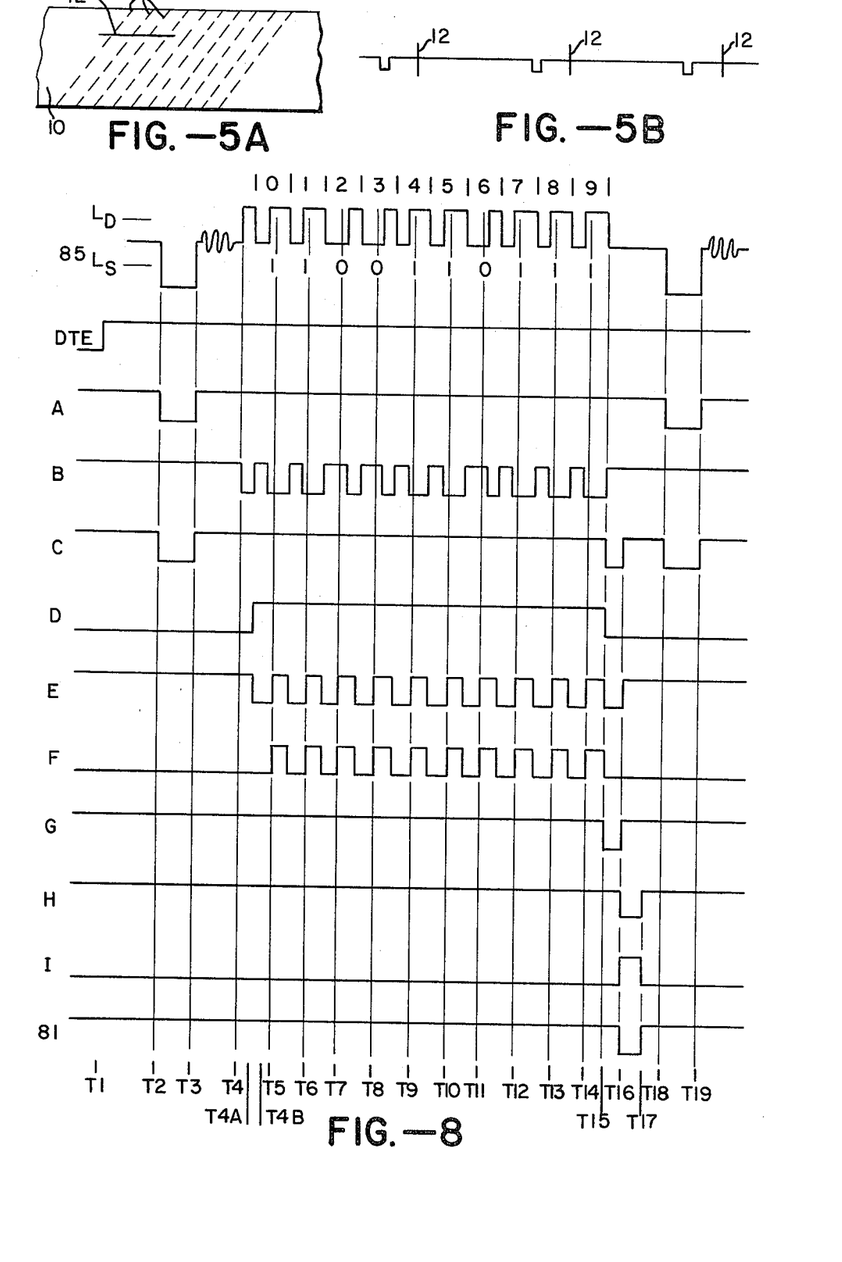
FIGS. 5A and 5B are schematic diagrams useful in explaining the advantage of this invention.
FIG. 8 is a waveform timing diagram useful in explaining the operation of the circuitry of FIG. 7.

The general characteristics of the formatting of data depicted in FIGS. 2 and 3 are crucial to the success of high accuracy recovery in accordance with this invention. High accuracy of data recovery is not provided simply because of the redundancy in the data word blocks and the sync word sets, but rather because of the particular format of the redundancy provided. FIG. 5A depicts a segment of video tape having the video signal track segments 11 indicated thereon in dashed lines. Each of the dashed line segments 11 represents one field between vertical sync pulses. Also depicted in FIG. 5A is a typical scratch 12 in the surface of the magnetic recording medium on video tape 10. In this case the scratch 12 is a horizontal scratch which extends across several video fields. FIG. 5B shows the scratch position as being generally in the same location with respect to the horizontal sync pulse associated with each field. The data format of this invention is based on the realization that scratches in the video tape recording medium generally tend to affect the same general area of successive video fields. This led to the realization that, by formatting the redundant blocks of data within each video field, accuracy of data recovery would be materially enhanced since scratches and other defects in the tape recording medium would generally affect data in only one of the redundant blocks of data words within each video field.

If redundancy were instead provided by recording redundant blocks of data in successive video fields, scratches such as scratch 12 shown in FIG. 5A would tend to wipe out the same data words in each redundant block or there would be overlap of data words affected by the scratch in the successive redundant blocks, thereby preventing accurate data recovery. Similarly, with respect to the formatting of the three redundant sync words in each set, providing a plurality of blank horizontal sync intervals between each recorded sync word was based on the realization that scratches and other defects in the magnetic recording medium have a width less than six horizontal sync intervals. Accordingly, by spacing the sync words by at least six blank horizontal sync intervals, a localized tape defect would at most affect one sync word out of the three enabling accurate recovery of the actual sync word data utilizing a two-out-of-three compare operation.

Other important aspects of the data format in accordance with this invention are the space between the vertical sync pulse and the first set of three redundant sync words and the space after the fourth set of redundant sync words and the next successive vertical sync pulse. The space before each vertical sync pulse is left to allow for signal perturbations which appear in the recovered signal because of the use of a phase locked loop circuit to synchronize the video tape recorder with the vertical sync pulse. If data were to be written right before the vertical sync pulse or too close to it, the data would be destroyed by the signal perturbations. Another purpose of leaving space between the end of the fourth set of redundant sync words and the following vertical sync pulse is to provide time for the computer system which is receiving the recovered data words to perform the two-out-of-three compare operation between the time that it detects the fourth set of redundant sync words which signal the end of the data segment and the arrival of the next block of data. Another important aspect of the overall data format of this invention is the provision of a ten bit byte associated with each data word with the first two bits used to differentiate sync words from data words. This enables the actual data words to fully utilize all of the possible data word values. Otherwise at least four data word values would have to be devoted exclusively to sync words. This cannot be permitted since the full range of values of the eight bit byte must be available when the data word is to be utilized as software program information for a microcomputer system. In an actual system implemented using the invention, writing the first two bit values as both ones is utilized to indicate that the following eight bits constitutes a data word whereas any zero in the first two bits indicates that the following eight bits are a sync word.

Figure 6:
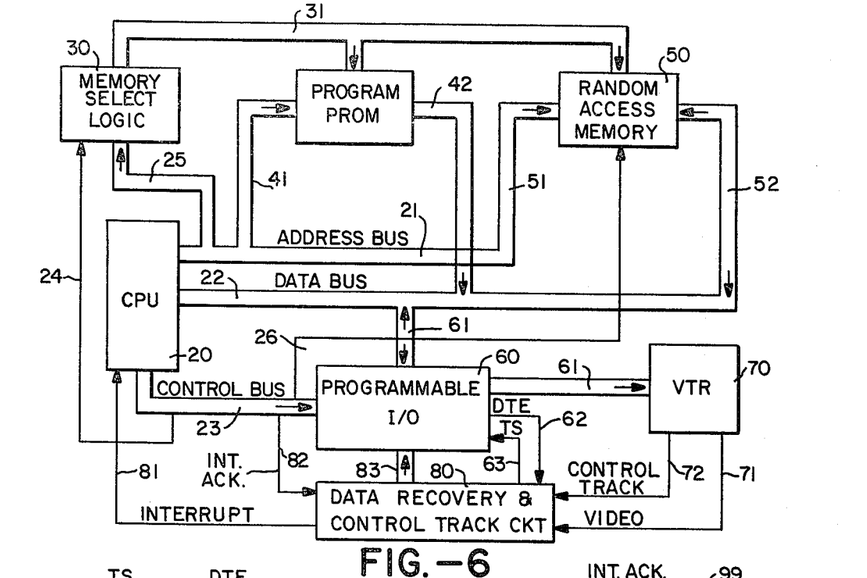
FIG. 6 is a block schematic diagram of a microcomputer based computer system interfaced to a video tape recorder and adapted to utilize the system and method of this invention for formatted data storage and recovery.

FIG. 6 discloses in block diagram form a microcomputer system interfaced to a video tape recorder for the recovery of digital data recorded on the video track in the format generally disclosed in FIGS. 1 to 4. The basic architecture of the microcomputer portion of the system is quite standard. A microprocessor type central processor unit (CPU) 20 communicates with a program PROM 40 and a random access memory unit 50 by way of address bus 21 and data bus 22. An address bus section 41 communicates address signals to program PROM 40 from address bus 21 and a bus segment 42 communicates data signals from program PROM 40 to data bus 22. Correspondingly, a bus segment 51 couples address signals from address bus 21 into random access memory unit 50 and bus segment 52 communicates data signals between data bus 22 and random access memory unit 50. Memory select logic 30 is driven by addresses from address bus 21 over bus segment 25 and by control signals from control bus 23 over control line 24 and functions to select the particular memory device addressed by the CPU 20 for data reading or writing. Control signal line 26 is provided for CPU 20 to place random access memory 50 selectively in write data and read data modes.

A programmable input/output (I/O) unit 60 communicates with CPU 20 by way of data bus 22 over a bus segment 61. I/O unit 60 may consist of several I/O devices and is controlled by CPU over control signal bus 23. Video tape recorder 70 is provided with function command signals over bus 61 from programmable I/O unit 60 so that CPU 20 can control the operating mode of VTR 70. VTR 70 is adapted to play a prerecorded video tape to produce video output signals on signal line 71 and control track pulse signals on signal line 72. Data recovery and control track circuit 80 receives the video signal and the control track signal and functions under CPU control to recover data and to enable tracking of the location of data segments on the video tape played on VTR 70. Data recovered by data recovery and control track circuit 80 is communicated to I/O device 60 via a bus segment 83. As will later be seen, data recovery and control track circuit 80 provides interrupt signals over control line 81 to CPU and receives interrupt acknowledge signals from CPU via control bus 23 and signal line 82. The interrupt acknowledge may actually be a logical combination of two signals on two different control bus lines. CPU 20 communicates data transfer enable (DTE) signals to data recovery and control track circuit 80 over signal line 62. Tone signals detected by the data recovery and control track circuit 80 are communicated to CPU 20 by way of signal line 63 through I/O device 60.

The system shown in FIG. 6 is a portion of the interactive microcomputer controlled video display system disclosed in detail in the above-referenced Rodesch and Cerracchio patent application. The manner in which this overall system recovers data prerecorded on a video tape in the format shown in FIGS. 1 to 3 and described above is as follows.

For this discussion it is assumed that VTR 70 is in a play mode and is playing a prerecorded tape having data on the video signal channel in the format previously disclosed. Accordingly, signal line 71 will contain the recovered video signal. As a prerecorded video tape plays to the point that the fields of recorded tone shown in FIG. 1 are encountered, a tone detector in data recovery circuit 80 detects the tone and sends a control signal on TS line 63 through I/O device 60 to CPU 20. CPU 20 determines that the tone signal is of sufficient duration and continuity and then sends, through I/O unit 60, a data transfer enable (DTE) signal on line 62 to data recovery circuit 80. This DTE signal enables the data recovery circuit which then begins to function to recover data words from the video signal input on a one word at a time basis. Each time a data word is recovered, the data recovery circuit sends an interrupt signal on line 81 to CPU 20 and presents the recovered data on bus 83 to I/O device 60. CPU 20 signals I/O device 60 to accept the data and place it on data bus 22 so that the CPU can cause it to be stored in random access memory 50. After the data word has been accepted and stored, the CPU sends an interrupt acknowledge signal over line 82 to data recovery circuit which resets the circuit to prepare it to recover the next data word. This data recovery cycle continues with each data word in a data segment being recovered in sequence and being stored in random access memory 50 under control of CPU 20.

In a preferred approach to data recovery, using the data format which involves recording redundant sets of sync words prior to each data block, the sync words are utilized to inform CPU 20 which block of data is next in sequence and enables CPU 20 to cause the next data block to be stored in a particular selected set of address locations within random access memory 50. Accordingly, as CPU 20 receives the first sync word from the data recovery circuit 80, it ascertains that a sync word has been transmitted by examining the first two bits of the word and begins a sync word processing routine. This sync word processing routine causes CPU 20 to accept the three sync words in succession, and to validate the sync word data based on a two-out-of-three compare process. Thereafter, CPU 20 determines from the validated sync word which block of data follows and sets up the addresses for loading the following block of data in a known address section of random access memory 50. After processing this sync word routine, CPU 20 loads the following block of data into the predetermined address locations in RAM 50 until it detects another set of sync words, whereupon it processes the next redundant set of sync words by using the same sync word routine. This continues for the three sets of the redundant sync words at the beginning of each of the three redundant blocks of data.

When CPU 20 encounters the fourth set of three redundant sync words, it interprets this fourth set of sync words as an end-of-data-segment signal and begins processing a program routine to do a two-out-of-three compare of the data now stored at known address locations in random access memory 50. Although the serial data recovery is a relatively slow process by computer standards, once the data segment has been recovered and stored in RAM 50, the validation process of performing a two-out-of-three compare proceeds very quickly at normal microprocessor instruction execution speed. The two-out-of-three compare validation is completed before the next data segment occurs and CPU 20 again enables data recovery circuit 80 to begin recovering in sequence the data words in the next data segment following the next vertical sync pulse. The process continues until the data segments in a particular data group or data dump come to an end. Generally this will be signalled by one of the data words in the last data segment in the group.

In the event that CPU 20 is unsuccessful in validating a particular data segment, CPU 20 enters into an abort search routine. In this abort search routine, CPU 20 signals the VTR 70 to go into fast reverse until it gets back to the beginning of the data dump. This system will then again try to recover the data in this particular data dump. If the second time through, the recovery is successful the system goes on to execute whatever program is contained in the data dump. If data validation is unsuccessful again, the CPU 20 directs a retry operation a second time. If the third try at recovering and validating data is unsuccessful, CPU 20 will send the system back to the last good data dump and read that data dump up to the position number information in the data dump. Then CPU 20 will send the VTR 70 back to the data dump which was unsuccessfully recovered and three more times the system will try to recover the data in that data dump. If the data recovery is still unsuccessful, CPU 20 will direct the display of an appropriate malfunction message on the monitor.

While the above explanation of data recovery has been given relative to a system in which data segments and live video segments are interspersed on the video signal track, it should be apparent that the system and method of this invention could also be applied in computer systems where only data is stored on the video signal track. The control track circuit part of data recovery and control track circuit 80 does not enter into the picture when data recovery is in process. Rather, the control track circuit portion functions when VTR 70 is in a play fast forward or reverse scan mode, during which time the control track circuit counts control track pulses on signal lead 72 from VTR 70 and produces an interrupt signal on line 81 to CPU 20 after a predetermined number of control track pulses have been counted. This enables CPU 20 to track the distance it has scanned the video tape during play fast forward or fast reverse. This function is utilized in the system disclosed in the above-referenced Rodesch and Cerracchio application to provide CPU-controlled random access to various program segments on the prerecorded video tape.

Figure 7:
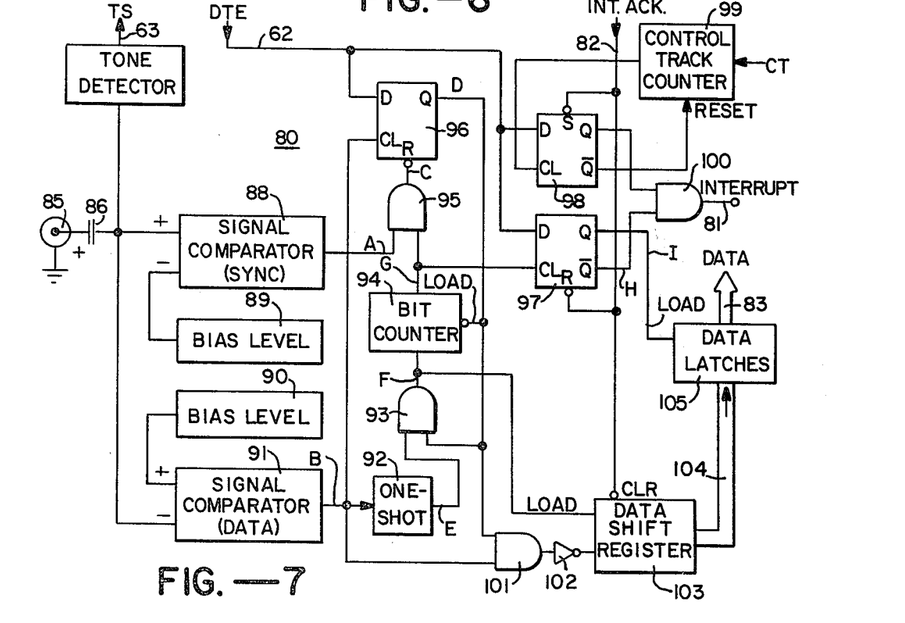
FIG. 7 is a block schematic diagram of a portion of the overall system depicted in FIG. 6.

The specific structure of data recovery and control track circuit 80 will depend on the type of data signal modulation utilized in recording the binary data on the video signal track of the video tape. Various types of data modulation techniques could be employed including frequency shift keying, phase shift keying, and biphase modulation. The data recovery circuit shown in block form in FIG. 7 is an example of a data recovery circuit which may be employed to recover data modulated in a biphase modulation as shown in FIG. 4. The structure and function of the data recovery and control track circuit 80 shown in FIG. 7 can best be understood from a consideration of its operation in response to a typical data word input signal as shown in the pulse timing diagram of FIG. 8. FIG. 8 shows the logic signal levels at various time intervals as the data recovery circuit processes the modulated data signal input on terminal 85. This modulated data signal is AC-coupled through an electrolytic capacitor 86 and is supplied to tone detector 87, the "plus" input of signal comparator 88 and the "minus" input of signal comparator 91. The minus input of signal comparator 88 receives an input DC bias level 89 which is depicted as the line $L_D$ in the graph labeled 85 at the top of FIG. 8. Similarly, the "plus" input of signal comparator 91 is supplied with a DC bias level from circuit 90 with the bias level indicated by the line $L_S$ in the waveform labeled 85 in FIG. 8. Consequently, the output of signal comparator 88 will be at a HIGH logic level except during a receipt of a horizontal sync pulse which triggers the signal comparator 88 to a LOW logic level. Signal comparator 91 will have a HIGH logic level output when the application of recovered data signal is below the bias level $L_D$ and shifts to a LOW output when the recovered data signal amplitude exceeds the level $L_D$ shown in FIG. 8.

Consider now the time sequence response of the circuit of FIG. 7 to the data waveform 85 shown in FIG. 8. For this purpose it is assumed that prior to time T1, tone detector 87 has detected several fields of recorded tone on input 85 and has signalled the CPU to provide a HIGH DTE signal on input line 62. The initial condition of the data recovery circuit 80 must be considered and is as follows. One shot multivibrator 92 is in an untriggered condition and its output E is HIGH. Bit counter 94 has a preset count loaded into it and its output G is HIGH. Flip-flop 96 is in a reset condition and its Q output, labeled D, is LOW. Flip-flop 97 is in a reset condition with its output labeled I LOW and its output labeled H HIGH. Flip-flop 98 is in a set condition with its output Q HIGH. Data shift register 103 is in a cleared condition. Data latches 105 contain whatever data was previously loaded into the latches.

At time T1 when DTE line 62 goes HIGH, this signal is supplied to the D inputs of flip-flops 96 and 97 preparing them to be placed in a set condition when their clock inputs CL next see a LOW to HIGH signal transition. At time T2, output line A goes LOW in response to the sync pulse. At time T3 when the sync pulse on terminal 85 ends, the output A of signal comparator 88 goes HIGH again taking the output C of AND gate 95 HIGH. Accordingly, at this time a reset signal is provided to flip-flop 96 to insure that it is in a reset condition.

At time T4 signal comparator 91 is triggered and its output B goes LOW. Since both one shot 92 and flip-flop 96 will only respond to a LOW to HIGH signal transition, this HIGH to LOW signal transition has no effect on the circuitry. However, at time T4A the output of signal comparator 91 goes HIGH again, and this LOW to HIGH signal transition clocks flip-flop 96 into a set state and triggers one shot 92. Accordingly, at time T4A output D of flip-flop 96 goes HIGH and output E from one shot 92 goes LOW. The setting of flip-flop 96 effectively enables the data recovery circuit to begin to recover the data in the waveform on input terminal 85. This HIGH signal on output D of flip-flop 96 enables bit counter 94 to begin counting recovered clock pulses and enables both AND gate 93 and AND gate 101. AND gate 93 is thus enabled to supply recovered clock pulses to bit counter 94 and to the load input of data shift register 103. AND gate 101 is enabled to couple the logic level signal on line B through inverter 102 to the data input of data shift register 103. The output B is inverted in amplifier 102 because the logic level of signal B is the inverse of the data at the time the recovered clock signal occurs.

As can be seen at time T4B, the output B of signal comparator 91 has gone LOW again and a short time later at time T5, one shot 92 times out and its output E goes HIGH. This LOW to HIGH transition of one shot output E constitutes a recovered data clock signal. Since AND gate 93 is enabled, this clock pulse is reflected in signal F at the output of AND gate 93 and the LOW to HIGH signal transition on output F increments the bit counter 94 and loads the first data bit (a binary ONE) into data shift register 103. Since B is LOW at time T5, the inverter 102 inverts that signal to a HIGH level at the data input to data shift register so that a binary ONE corresponding to the data value in the recovered data waveform is entered into data shift register 103.

At each successive LOW to HIGH transition of the waveform B, one shot 92 is triggered and subsequently times out to provide the clock pulses for incrementing bit counter 94 and loading the next data bit into data shift register 103. Accordingly, at times T6 through T14, nine additional data bits are recovered and nine additional incremental counts are entered into bit counter 94. At time T15, since bit counter 94 has counted ten clock pulses, its output G goes LOW. As G goes LOW, the output C of AND gate 95 also goes LOW, resetting flip-flop 96. Then, within a few gate delay periods, the output D of flip-flop 96 goes LOW, causing bit counter 94 to assume its preset count and its output G to go HIGH again. As D goes LOW, it enables AND gate 93 and AND gate 101 so that the final clock pulse output from one shot 92 will not increment bit counter 94 or load an additional data bit into shift register 103.

When signal G goes HIGH again at time T16, this LOW to HIGH signal transition serves as a clock input to flip-flop 97, causing the flip-flop to set. The respective complementary outputs H and I of flip-flop 97 switch logic values at this time with H going LOW and I going HIGH. As I goes HIGH it provides a load data signal to data latches 105 so that parallel output data on bus 104 from data shift register 103 is loaded into data latches 105 and presented on output bus 83. At the same time, the H signal going LOW causes the output 81 of AND gate 100 to go LOW, generating the interrupt signal. A short time later at time T17, an interrupt acknowledge signal is received on line 82 which resets flip-flop 97 and clears the data from data shift register 103. The data recovery circuit has thus recovered and supplied to the CPU the ten bits of data recovered from the input video signal waveform. With the arrival of the next sync pulse at time T18, the data recovery circuit is set up to recover the next data word. The next sync pulse again triggers comparator 88 to send a reset signal to flip-flop 96. This ensures that flip-flop 96 has been reset and bit counter 94 has the proper initial count loaded in so that recovery of the next data word can be accomplished even if a tape defect prevented recovery of the previous word.

The data recovery and control track circuit 80 shown in FIG. 7 also functions to provide interrupt signals to CPU 20 (FIG. 6) in response to a predetermined number of control track counts on control track (CT) signal lead 72. A control track counter 99 receives the control track input pulses on lead 72 and provides an output signal after a preselected number of pulses are counted as a clock signal to flip-flop 98. Flip-flop 98 is normally in a set condition. During a fast forward or reverse scan of VTR 70 the data transfer enable line (DTE) 62 is LOW. Accordingly, when control track counter outputs a signal to the clock input of flip-flop 98, it causes a zero to be clocked into the flip-flop placing the flip-flop 98 in a reset condition. Each time the flip-flop is reset, its $\overline{Q}$ output goes LOW, forcing the output 81 of AND gate 100 LOW. This HIGH to LOW signal transition on lead 81 is an interrupt signal to CPU 20 (FIG. 6). The $\overline{Q}$ output of flip-flop 98 provides a reset to control track counter 99. Consequently, control track counter 99 will continually output clock pulses after being incremented a selected number of times by the control track pulses on input 72. After an interrupt signal on signal line 81 has been generated, a short time later an interrupt acknowledge will be provided on signal line 82 to place flip-flop 98 again in a set condition, removing the reset from control track counter 99 and enabling it to count the next sequence of control track pulses.

Figure 9:
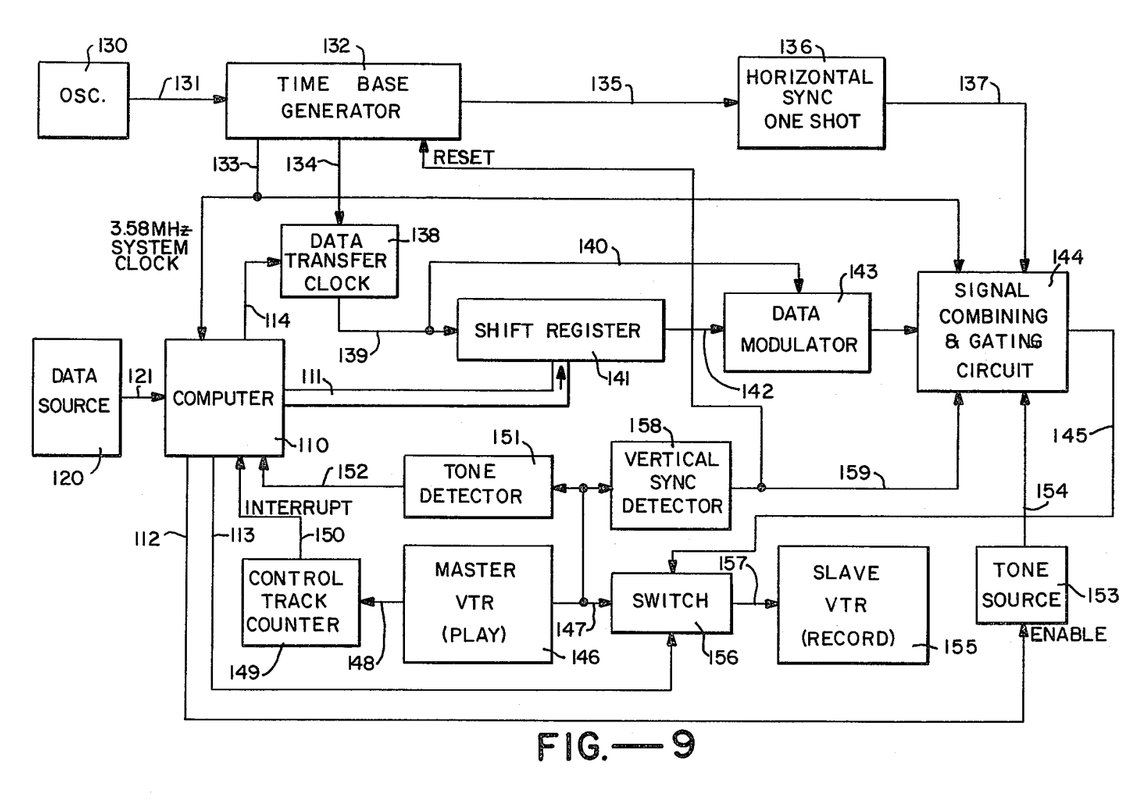
FIG. 9 is a block schematic diagram of a system for writing data on video tape in a format in accordance with this invention.

FIG. 9 illustrates in block diagram form one type of system which may be utilized for writing binary data on a video tape in the format of this invention. The system of FIG. 9 functions essentially under the control of a computer 110 linked to a data source 120 via a data bus 121. Data source 120 contains the basic program data and/or text data which is to be written onto the video tape and may be, for example, a floppy disc data storage device which is adapted to recover previously recorded data segments from a floppy disc data storage medium. Computer 110 is provided with a system clock input over signal line 133 from timebase generator 132. Timebase generator 132 is driven by a master oscillator 130 which provides a master frequency signal on signal line 131. Time-base generator 132 is essentially a string of frequency dividers which divide the master oscillator frequency down to the various lower frequencies required for operating the system. One of the timebase generator outputs on line 134 provides an input to drive a data transfer clock 138 whose output 139 drives a data shift register 141 and a data modulator 143. Another output of timebase generator 132 on signal lead 135 triggers horizontal sync one shot 136 whose output 137 is provided to signal combining and gating circuit 144.

Master video tape recorder 146 functions in the system to play a prerecorded tape having the live video segments already recorded on the tape at appropriate tape locations with each of the live video segments followed by a recorded tone signal which is received by tone detector 151 to signal computer 110 over signal line 152 that the video tape is at the position where a data group should be written. The master VTR output signal on line 147 is provided through a switch arrangement to a slave VTR 155 which is functioning in a record mode. As the master VTR recovers and outputs the live video segments, they are recorded on the slave VTR. A control track counter 149 linked to master VTR 146 by signal line 148 produces interrupts to computer 110 over signal line 150 to enable computer 110 to track the tape location of the master tape being played on the master VTR. This enables computer 110 to generate and include in the data to be written on the video tape in the slave VTR 155 the tape position of the data group which is next to be written on the video tape.

After receiving the output signal from tone detector 151, computer 110 will send a signal over control line 113 to switch 156 to connect the input 157 to slave VTR to receive the output from signal combining and gating circuit 144 over signal line 145. Thereafter, vertical sync pulses to be recorded on the slave VTR 155 will be maintained in synchronism with the vertical sync pulses on master VTR by using a vertical sync detector 158 to strip the vertical sync signals from the master VTR and supply them through the signal combining and gating circuit 144 to the slave VTR. In addition, the output of the vertical sync detector is provided as a reset to the timebase generator 132 to insure that the subsequently generated horizontal sync pulses and the modulated data to be written between horizontal sync pulses is synchronized with the vertical sync intervals of the master VTR.

After the computer 110 has switched the input to slave VTR to the output of signal combining and gating circuit 144, tone source 153 is enabled via control line 112 to supply via signal line 154 a plurality of fields of recorded tone. Signal combining circuit 144 places these tone signals on signal line 145 so that they will be recorded on the video tape on slave VTR 155. Thereafter computer 110 will begin to supply appropriate data words over data bus 111 to shift register 141. These data words will be written into the shift register 141 in parallel following the occurrence of a horizontal sync pulse. After each data word is supplied to shift register 141, computer 110 will enable data transfer clock 138 over signal line 114. Data transfer clock 138 will then provide clock pulses on lead 139 to shift register 141 and on signal line 140 to data modulator 143. Data transfer clock pulses on lead 139 will shift data bits serially out of shift register 141 onto signal line 142 and into data modulator 143. Data modulator 143 logically combines the shift register output signals with data transfer clock signals to produce a biphase data modulation such as is shown in FIG. 4. The modulated data signal is then supplied to signal combining and gating circuit 144 which places the modulated data signal on output line 145 to supply it to slave VTR 155 for recording on the video tape. The process of sending data in parallel to shift register 141 and clocking it out serially into data modulator 143 continues until all of the data words in a particular data segment have been modulated and supplied to slave VTR 155. Computer 110 will control the supplying of the appropriate redundant sync words and format the data with blank horizontal sync intervals between sync words and the three redundant blocks of data words as shown in FIG. 2 of the drawings.

After all of the data segments in a particular group have been recorded on slave VTR, computer 110 will signal switch 156 over control line 113 to again couple the output 147 of master VTR 146 into the slave VTR 155. Slave VTR 155 will then continue recording the live video segments from the master VTR until the master VTR again signals to computer 110 that the next data group should be written onto the tape on slave VTR 155. It will be appreciated that the system of FIG. 9 is one approach that can be taken to interweaving live video segments and data groups on a video tape and numerous other approaches could be taken to accomplish essentially the same function. As previously indicated the important feature of this invention is that that data writing system perform the data formatting which is shown in FIGS. 1 to 3 in order to permit high accuracy recovery of the data as previously described.

While this invention has been disclosed above in terms of a preferred embodiment, it should be understood that numerous modifications could be made without departing from the scope of the invention as claimed in the following claims. For example, it would be possible to avoid the use of sync words in the data format provided the data blocks always have the same number of data words (by padding with zeros as necessary) and the computer system is programmed to count the input data words to determine when recovery of a data segment has been completed so that the data validation routine can be initiated.

It should be also understood that, when the invention is used with computer systems having large RAM capacity, data from many segments could be recovered and stored before a validation operation is performed.

What is claimed is:

1. A prerecorded tape adapted to be played on a video tape player to recover information thereon, said tape having binary data recorded on the video signal track thereof in a prearranged format comprising at least three redundant blocks of data words between successive vertical sync pulses recorded on said video signal track.

2. The program tape of claim 1, wherein each data word on said tape is written between a pair of successive horizontal sync pulses, and each of said redundant blocks of data words is preceded by a set of at least three redundant sync words, said sync words in each set being separated from each other by a plurality of blank horizontal sync pulse intervals and having a data content indicating the block number of the following block of data words.

3. The program tape of claim 2, wherein said redundant blocks of data words may vary in length from one vertical sync pulse interval to another and the last of said blocks of redundant data words is followed by a set of at least three redundant sync words having a data content indicating the end of a set of redundant data blocks, said sync words being separated from each other by a plurality of blank horizontal sync pulse intervals.

4. A prerecorded program tape adapted to be played on a video tape player to recover program information thereon, said tape having a plurality of live video segments and a plurality of data groups recorded in interspersed fashion on the video signal track thereof, each of said data groups comprising an initial tone signal recorded on said video signal track to signal the presence of the data group and at least one data segment following said tone signal and being recorded on said video signal track between successive vertical sync pulses in a prearranged format comprising at least three redundant blocks of data words, each of said redundant blocks of data words being preceded by a set of at least three redundant sync words and the last of said redundant blocks of data words being followed by a set of at least three redundant sync words, each of said sync words in said sets being separated from each other by a plurality of blank horizontal sync pulse intervals, the last of said sets of redundant sync words having a data content indicating the end of the data segment and the others of said sets of redundant sync words having a data content indicating the block number of the following block of data.

5. In a data storage and retrieval system: a video tape player; a prerecorded tape adapted to be played on said video tape player to recover signal information on the video signal track thereof, said tape having binary data words recorded on said video signal track in the format of at least three redundant blocks of data words between successive vertical sync pulses recorded on said video signal track; and a data retreival means coupled to said VTR for recovering individual data words as said prerecorded tape is played on said VTR, for storing said recovered data words in redundant sets, and for comparing associated data words in said redundant sets for selecting and storing valid data words based on finding identity amoung a preselected plurality of associated data words in said redundant sets.

6. The system of claim 5, wherein said retreival means includes a data recovery circuit coupled to said VTR, a data processing system interfaced to said data recovery circuit and a random access data storage device interfaced to said data processing system, said data recovery circuit and said data processing system being operative together to recover individual data words in said redundant sets and to store said recovered data words in selected locations in said random access data storage device, and said data processing system being operative to compare associated redundant data words stored in said data storage device for selecting and storing validated data words from said redundant sets when a preselected plurality of associated redundant data words are found to be identical.

7. In a data storage and retrieval system: a video tape player; a prerecorded tape adapted to be played on said video tape player to recover signal information on the video signal track thereof, said tape having binary data words recorded on said video signal track between successive vertical sync pulses in a prearranged format comprising at least three redundant blocks of data words, each of said redundant blocks of data words being preceded by a set of at least three redundant sync words and the last of said redundant blocks of data words being followed by a set of at least three redundant sync words, each of said sync words in said sets being separated from each other by a plurality of blank horizontal sync pulse intervals, the last of said sets of redundant sync words having a data content indicating the end of the data segment and the others of said sets of redundant sync words having a data content indicating the block number of the following block of data, each of said sync words and data words being formatted as a first block of data bits for differentiating sync words from data words and a second block of data bits constituting a data word or sync word; and a data retrieval means coupled to said VTR for retrieving said binary data words on said prerecorded tape, said data retrieval means including a data recovery circuit coupled to said VTR, a data processing system interfaced to said data recovery circuit, and a random access data storage device interfaced to said data processing system, said data recovery circuit and said data processing system being operative together to recover individual sync words and data words in said redundant sets and to store said recovered data words in selected locations in said random access data storage device based on said sync words, and said data processing system being operative upon receiving said last set of redundant sync words to compare associated redundant data words stored in said data storage device and to selectively store validated data words from said redundant sets when a preselected plurality of associated redundant data words are found to be identical.

8. In a method of storing binary data words on video tape and recovering said data words with high accuracy, the steps of:
recording segments of data words on the video signal track of said video tape between successive vertical sync pulses in a prearranged format comprising at least three redundant blocks of data words;
playing said video tape on a video tape player to recover video signal information including said data segments on said video signal track;
recovering individual data words from said video signal information as said tape is played;
storing said recovered data words in identifiable redundant blocks;
comparing associated ones of said stored data words in said identifiable redundant blocks to test whether a preselected plurality of said associated words are identical and to validate data words passing said test; and storing said validated data words.

9. The method of claim 8, wherein each of said data words is recorded between a pair of successive horizontal sync pulses, and each of said redundant blocks of data words is preceded by a set of at least three redundant sync words, said sync words in each set being separated from each other by a plurality of blank horizontal sync pulse intervals and having a data content indicating the block number of the following block of data words, and said sync being recovered during said step of recovering individual data words and being used during said step of storing to determine the storage location of the succeeding block of data words.

10. The method of claim 9, wherein said redundant blocks of data words may vary in length from one vertical sync pulse interval to another and the last of said blocks of redundant data words is followed by a set of at least three redundant sync words having a data content indicating the end of a set of redundant data blocks and initiating said comparing step, said sync words being separated from each other by a plurality of blank horizontal sync pulse intervals.

* * * * *